(No Model.)
H. C. RICE.
COMBINED KETTLE AND URN.
No. 256,921. Patented Apr. 25, 1882.
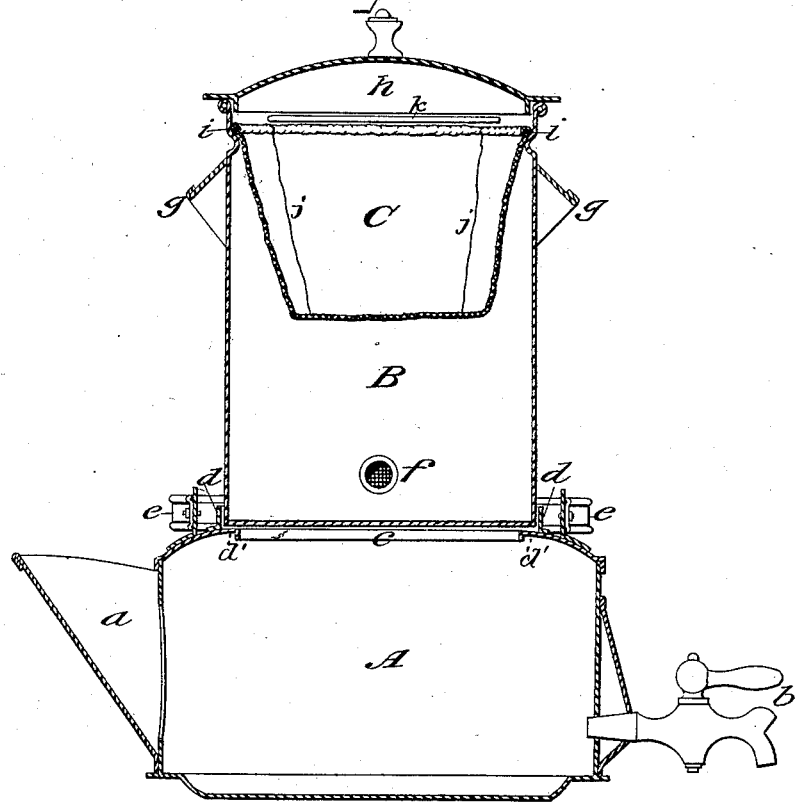
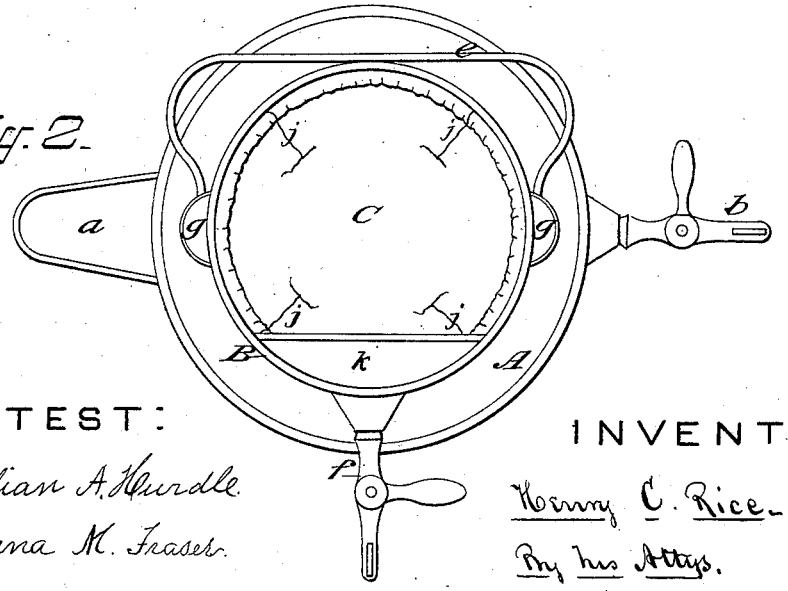
ATTEST:
Julian A. Hurdle
Anna M. Fraser
INVENTOR:
Henry C. Rice
By his Attys.
Burke, Fraser & Connett
N. PETERS, Photo-Lithographer, Washington, D. C.

UNITED STATES PATENT OFFICE.

HENRY C. RICE, OF LOUISIANA, MISSOURI.

COMBINED KETTLE AND URN.

SPECIFICATION forming part of Letters Patent No. 256,921, dated April 25, 1882.

Application filed March 30, 1880. (No model.)

*To all whom it may concern:*

Be it known that I, HENRY C. RICE, a citizen of the United States, residing at Louisiana, in the county of Pike and State of Missouri, have invented a Combined Kettle and Urn or Pot, of which the following is a specification.

This invention relates to the combination of a kettle for heating water and an urn or pot for coffee or other decoctions arranged to sit on or in the kettle, all as will be more fully hereinafter set forth.

In the drawings which serve to illustrate my invention, Figure 1 is a vertical mid-section of the combined kettle and urn. Fig. 2 is a plan of the same with the cover of the urn removed.

Let A represent the kettle provided with a spout, $a$, and a faucet, $b$. This kettle has an open top, $c$, and around this opening and a little way back from the same is raised a rim, $d$, which leaves a marginal ledge, $d'$, around the opening $c$, as shown in Fig. 1. The kettle is provided with a handle, $e$, of the usual kind, whereby it may be lifted.

B is an urn or pot provided with a faucet, $f$, handles $g$ $g$, and a cover, $h$. This urn is arranged to sit on the ledge $d'$ around the opening in the kettle and to cover the latter, as shown.

C is a filter, of some flexible textile material, provided with a wire, $i$, around its top to form an expanding ring. This ring may be solid or complete or it may be cut so as to be sprung into place. When in position in the urn or pot it rests on an internal bead or ledge formed in the wall of the urn, as shown. The filter is made from one piece of textile material cut and seamed as at $j$ $j$.

As the urn is adapted to perform all the functions of a coffee-pot, from which the liquid contents may be poured in the usual way, I provide it with a lip or dam, $k$, best shown in Fig. 2, which serves to prevent the escape of the coffee over the top in pouring. This dam is fixed rigidly and permanently to the wall of the pot just above the bead, upon which the ring or wire $i$ rests, and in inserting the latter it is first pushed under the dam and then presses down upon its seat. The flexibility of the strainer or filter C permits of its ready insertion as described.

I am aware that such dams have been attached to the walls of strainers in pots; but such do not prevent the liquid from the pot from escaping in pouring out between the said strainer and the walls of the pot. In my construction it can escape from neither the strainer nor the pot.

I am also aware that such lips are employed in ice-pitchers, but these are not constructed as in my apparatus, nor are they used in connection with filters for straining.

Where the dam is used a spout will usually be employed on the urn or pot. The spout $a$ on the kettle serves the purpose of an inlet, whereat the water may be got into the same without removing the urn or pot, and it also performs the ordinary functions of a spout when the urn is removed. The faucet $b$ serves to draw water from the kettle without removing the urn or pot.

The two vessels combined and arranged as herein shown form a very convenient household utensil, the kettle being capable of use for ordinary purposes when not employed as a heater for the urn.

I am aware that coffee-making apparatus have been devised in which one vessel or boiler with a horizontal partition to separate the water from the decoction has been employed, but this differs from my invention in that its parts are not separable nor capable of separate use, the base not being adapted for use as a kettle.

Having thus described my invention, I claim—

1. The combination, with a pot or urn provided with a lip or dam and with a bead or ledge directly below said dam, of a flexible filtering bag or strainer provided with a ring to expand its mouth and arranged to be suspended from the bead below the dam, substantially as shown.

2. The combination, with the urn or pot B, provided with the dam $k$ and flexible strainer C, of the kettle A, provided with the opening $c$, the marginal ledge $d'$, and the rim $d$, all substantially as set forth.

In witness whereof I have hereunto signed my name in the presence of two subscribing witnesses.

HENRY C. RICE.

Witnesses:
ADDIE J. RICE,
D. A. BALL.